United States Patent
Kalinowski

(10) Patent No.: US 7,703,855 B1
(45) Date of Patent: Apr. 27, 2010

(54) VEHICLE SEAT ASSEMBLY

(75) Inventor: David Kalinowski, Ferndale, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/346,417

(22) Filed: Dec. 30, 2008

(51) Int. Cl.
*A47C 7/02* (2006.01)

(52) U.S. Cl. .................................. 297/452.6

(58) Field of Classification Search .............. 297/218.3, 297/218.5, 410, 452.59, 452.6
See application file for complete search history.

(56) References Cited

U.S. PATENT DOCUMENTS

| | | | | |
|---|---|---|---|---|
| 2,135,657 | A | * | 11/1938 | Church .................. 297/396 |
| 2,860,691 | A | * | 11/1958 | Caesar .................. 297/322 |
| 3,159,427 | A | * | 12/1964 | Lawson .................. 297/410 |
| 3,233,253 | A | * | 2/1966 | Cauvin .................. 5/402 |
| 3,630,572 | A | * | 12/1971 | Homier .................. 297/452.6 |
| 3,727,980 | A | * | 4/1973 | Tischler .................. 297/452.53 |
| 3,794,378 | A | | 2/1974 | Haslam at al. |
| 4,232,899 | A | * | 11/1980 | Fister, Jr. .................. 297/229 |
| 4,317,591 | A | * | 3/1982 | Ramsey .................. 297/452.6 |
| 4,558,905 | A | * | 12/1985 | Natori .................. 297/452.6 |
| 4,609,226 | A | | 9/1986 | Yoshizawa |
| 4,798,416 | A | | 1/1989 | Faust et al. |
| 5,820,222 | A | | 10/1998 | De Filippo |
| 6,443,525 | B1 | | 9/2002 | Haupt |
| 6,568,761 | B2 | | 5/2003 | Perske et al. |
| 6,592,181 | B2 | | 7/2003 | Stiller et al. |
| 7,134,730 | B2 | | 11/2006 | Flegal et al. |
| 7,267,407 | B1 | | 9/2007 | Demick et al. |
| 7,401,829 | B2 | | 7/2008 | Michalski et al. |
| 7,419,213 | B2 | | 9/2008 | Itakura |
| 2003/0213105 | A1 | | 11/2003 | Bednarski |

* cited by examiner

*Primary Examiner*—Joseph F Edell
(74) *Attorney, Agent, or Firm*—Global IP Counselors, LLP

(57) ABSTRACT

A vehicle seat includes a seat frame with at least one attachment point, a foam pad overlying the seat frame with at least one attachment opening and a flexible seat trim cover. The flexible seat trim cover overlies a front surface of the foam pad. The seat trim cover has at least one attachment member extending through the attachment opening. The attachment member is secured to the attachment point of the seat frame to hold the seat trim cover against the front surface of the foam pad.

19 Claims, 10 Drawing Sheets

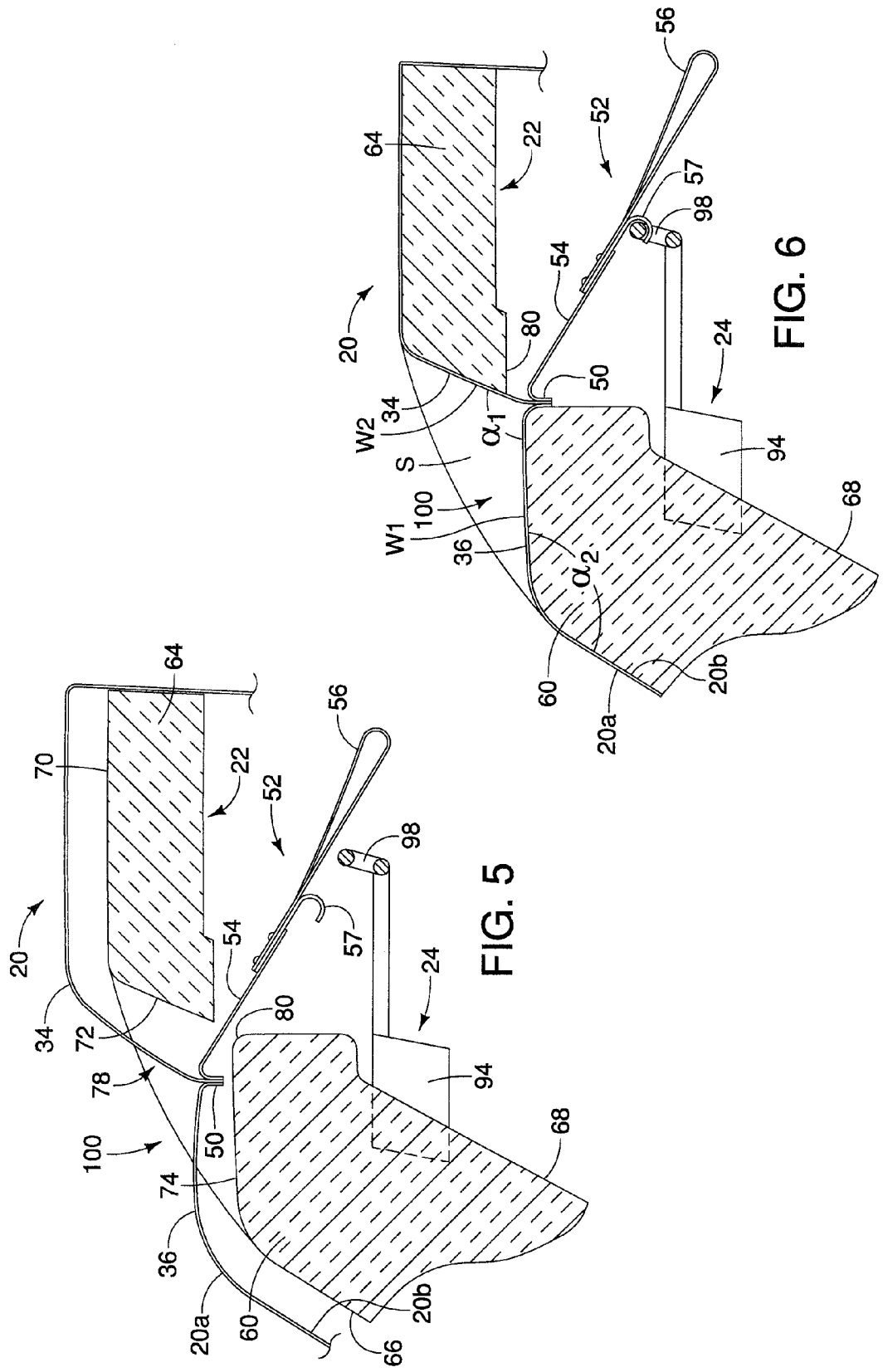

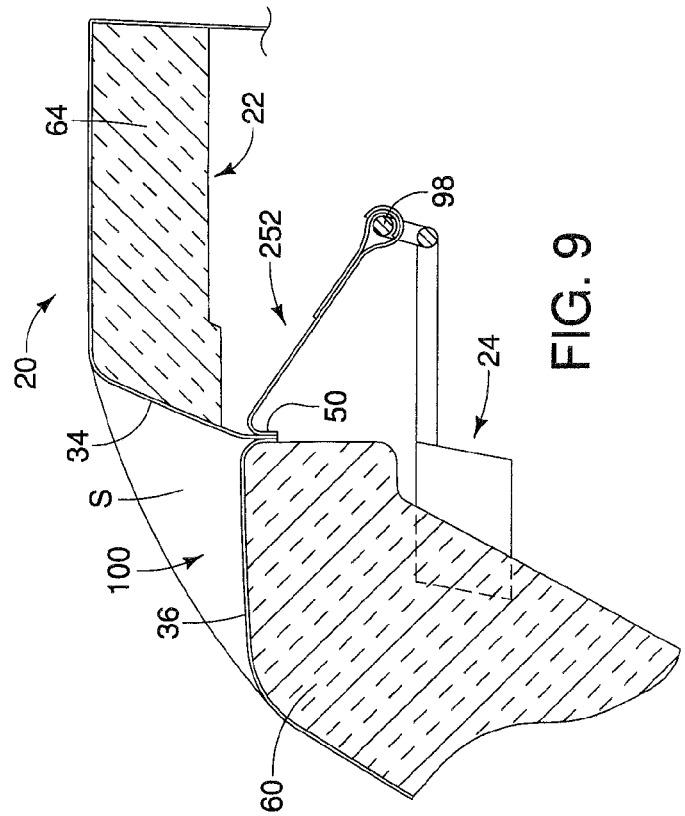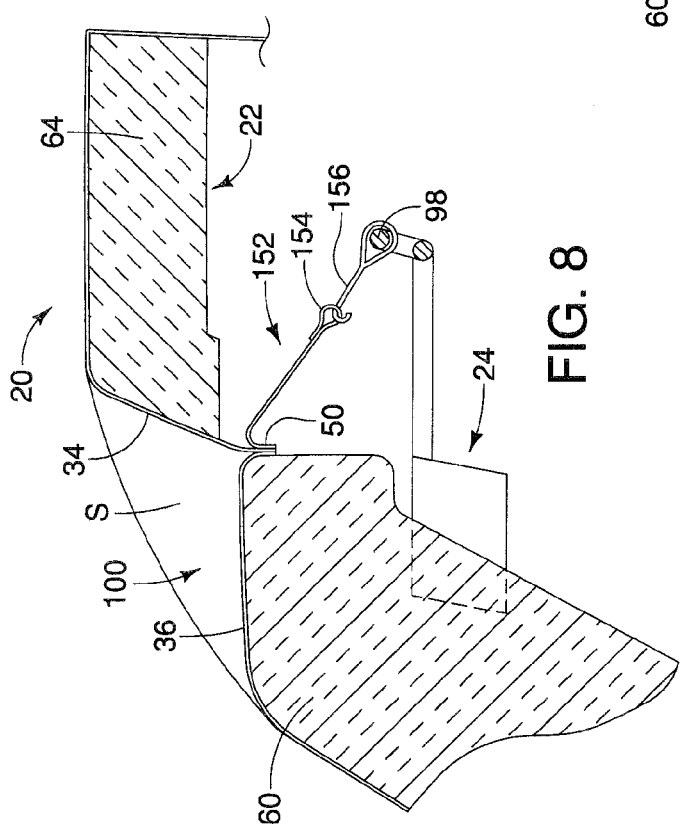

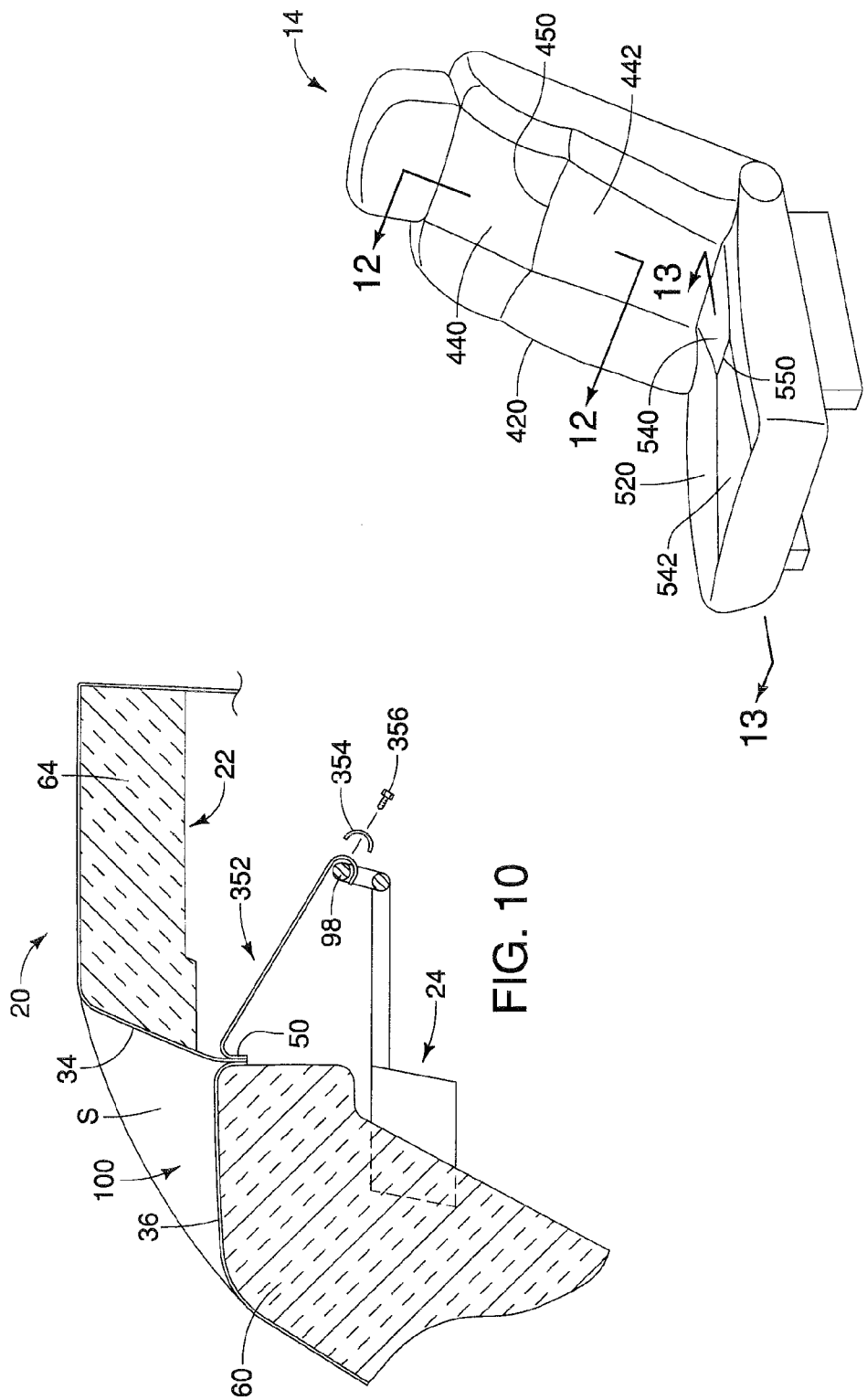

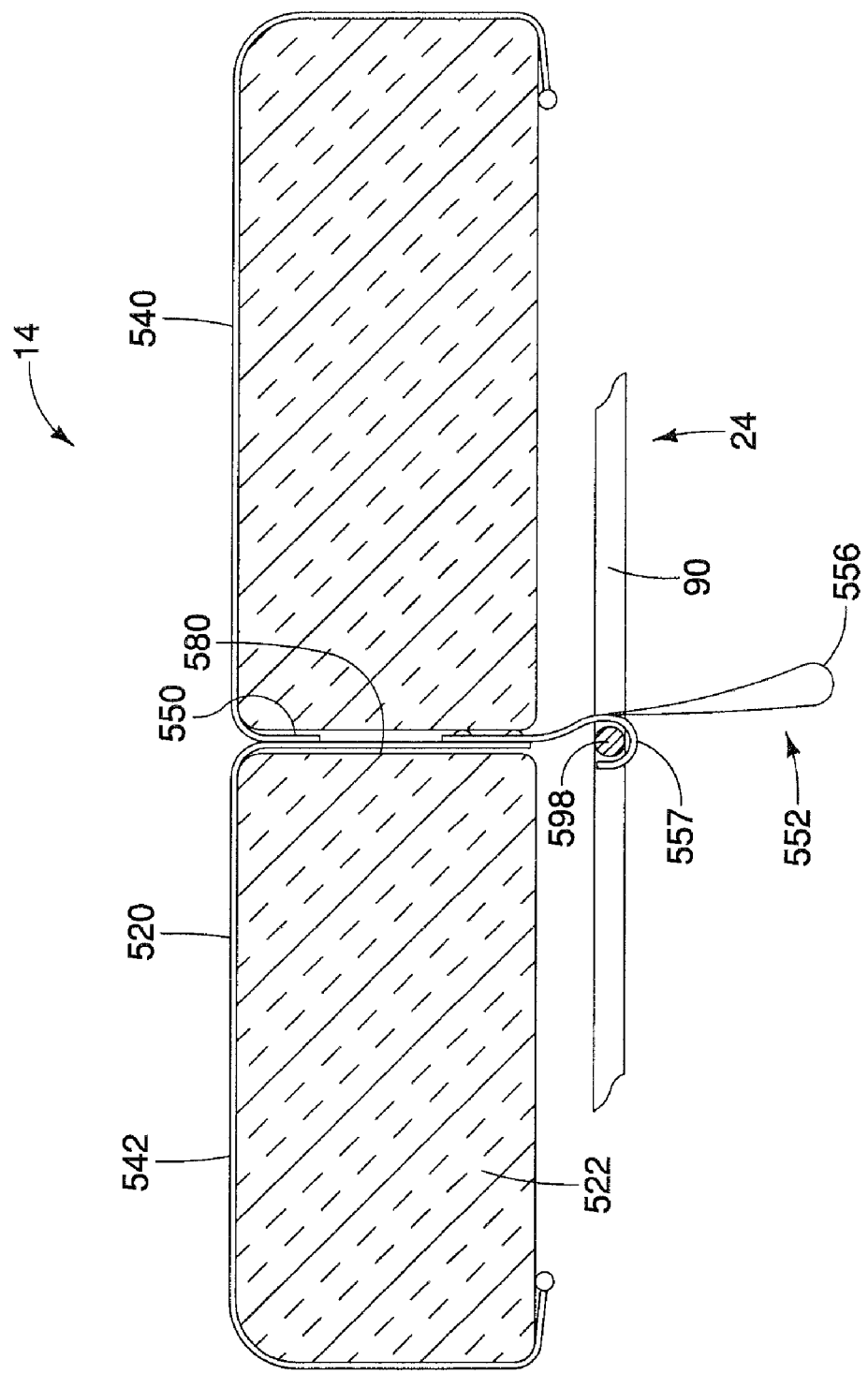

VEHICLE SEAT ASSEMBLY

BACKGROUND OF THE INVENTION

1. Field of the Invention

The present invention generally relates to a vehicle seat assembly. More specifically, the present invention relates to a vehicle seat assembly that includes a flexible seat trim cover that covers a foam pad and is fixed to portions of the frame of the vehicle seat assembly.

2. Background Information

Conventional vehicle seat assemblies are typically upholstered fixtures that include a seat frame, a foam pad and a seat trim cover. In many seat designs, the seat trim cover is an assembly of individual elements made of textile and/or leather or leather-like materials that are sewn or otherwise seamed together to form the final seat trim cover. In recent seat designs, the seat trim cover has become a very sophisticated and complex assembly that includes a variety of shapes that help to define the overall shapes and contours of completed the seat assembly.

In conventional seat construction, the foam pad is typically positioned on and/or attached to portions of the seat frame. Elements of the seat trim cover are positioned against surfaces of the foam pad and fixed in place by attachment configurations and seams such that the final upholstered assembly includes the seat trim cover surrounding and covering the foam pad and the seat frame. Since the seat trim cover surrounds both the foam pad and the seat frame, the seat trim cover holds the foam pad in position relative to the seat frame. In some seat designs, bands of flexible polymer material are laced through J-hooks formed along edges of the seat trim cover and corresponding mating portions of the seat frame. The flexible polymer material, the J-hooks and the mating portions of the seat frame hold the seat trim cover in position on the foam pad and the seat frame.

In some conventional seat designs, elements of the seat trim cover are fixed to the foam pad in order to maintain the seat trim cover in a prescribed shape and a prescribed position relative to the foam pad. In other seat designs, the seams joining the elements of the seat trim cover are inserted into mating recesses formed in the foam pad such that an outer surface of the seat trim cover has a smooth rounded appearance. The insertion of the seams into the mating recesses also helps to maintain the position of the seat trim cover relative to the foam pad and the seat frame.

However, in designs where the seat assembly surface has concaved or recessed sections, it is necessary to fix adjacent portions of the seat trim cover directly to the foam pad, otherwise, the seat trim cover can separate from the foam cover, thereby giving the seat trim cover an undesirable appearance.

Recent innovations in seat upholstery include employing an anchor member that extends from an inner surface of the seat trim cover, through a hole in the foam pad, terminating with a flat button-like portion that is disposed on an inner hidden side of the foam pad opposite from the seat trim cover. Thus, the seat trim cover is retained in position relative to the foam pad. A problem with such an anchor member occurs when the foam pad is compressed by a passenger and the clip can be felt by the passenger.

In view of the above, it will be apparent to those skilled in the art from this disclosure that there exists a need for an improved seat trim cover that is held against a foam pad without the use of a noticeable anchor member. This invention addresses this need in the art as well as other needs, which will become apparent to those skilled in the art from this disclosure.

SUMMARY OF THE INVENTION

One object of the present invention is to provide a seat assembly with a concealed attachment member that retains the shape and contour of a concave or recessed portion of the seat assembly.

In accordance with one aspect of the present invention, a vehicle seat includes a seat frame with at least one attachment point, a foam pad overlying the seat frame with at least one attachment opening and a flexible seat trim cover. The flexible seat trim cover overlies a front surface of the foam pad. The seat trim cover has at least one attachment member extending through the attachment opening and secured to the attachment point of the seat frame to hold the seat trim cover against the front surface of the foam pad.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is a cross-sectional view of the backrest portion of the upholstered seat assembly taken along the line 5-5 in FIG. 3, showing an attachment member extending from a seam that joins at least two upholstery panels together, with the attachment member extending through an opening in the foam pad in accordance with a first embodiment of the present invention;

FIG. 6 is another cross-sectional view of the backrest portion of the upholstered seat assembly similar to FIG. 5, showing the attachment member fixed to an attachment point of the seat frame in accordance with a first embodiment of the present invention;

FIG. 8 is a cross-sectional view of the backrest portion of the upholstered seat assembly showing an attachment member fixed to an attachment point of the seat frame in accordance with a second embodiment of the present invention;

FIG. 9 is a cross-sectional view of the backrest portion of the upholstered seat assembly showing an attachment member fixed to an attachment point of the seat frame in accordance with a third embodiment of the present invention;

FIG. 10 is a cross-sectional view of the backrest portion of the upholstered seat assembly showing an attachment member fixed to an attachment point of the seat frame in accordance with a fourth embodiment of the present invention;

FIG. 11 is a perspective view of another one of the upholstered seat assemblies showing a backrest portion in accordance with a fifth embodiment of the present invention and a seat cushion portion in accordance with a sixth embodiment of the present invention;

FIG. 13 is a cross-sectional view of the seat cushion portion of the upholstered seat assembly showing an attachment member fixed to an attachment point of the seat frame in accordance with the sixth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
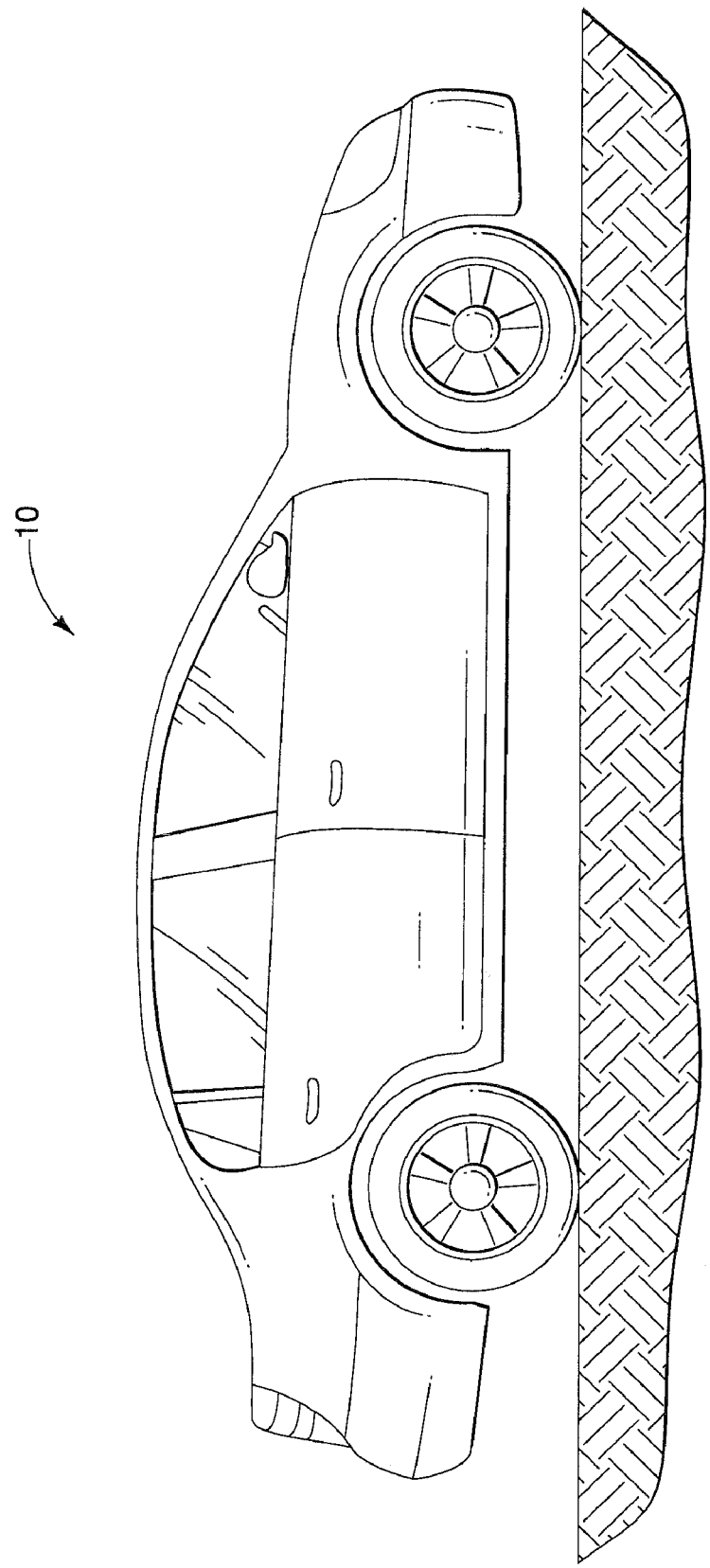
FIG. 1 is a side view of a vehicle having a plurality of upholstered seat assemblies in accordance with the present invention.
Figure 2:
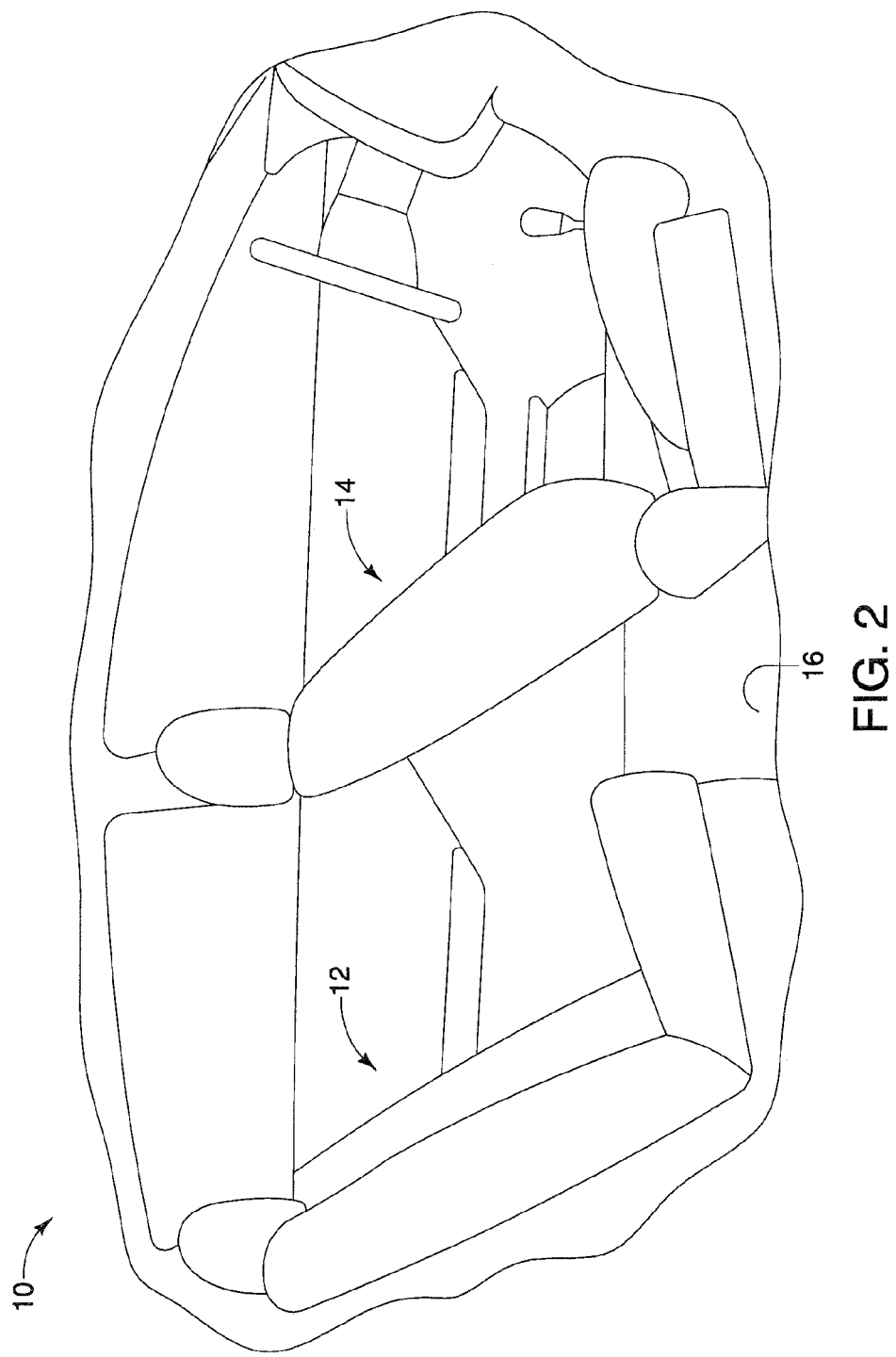
FIG. 2 is a side view of an interior portion of the vehicle depicted in FIG. 1, showing the plurality of upholstered seat assemblies in accordance with the present invention.

Referring initially to FIGS. 1 and 2, a vehicle 10 having a plurality of upholstered seat assemblies 12 and 14 is illustrated in accordance with a first embodiment of the present invention. The upholstered seat assemblies 12 and 14 have a variety of shapes and contours. For the purpose of explaining the present invention, two such overall shapes and contours are depicted. However, as will be understood from the description and drawings, the present invention is applicable to any of a variety of vehicle seat upholstery shapes and contours. For example, the upholstered seat assembly 12 is a rear seat and can be a bench-type seating configuration configured to seat two or three passengers or can be a bucket-type seat that seats only one passenger. The upholstered seat assembly 14 is a front seat that can be a bucket-type seat configured to seat one passenger only or can alternatively be a bench-type seat to seat two or three passengers (not shown). Each of the upholstered seat assemblies 12 and 14 has shapes and contours that include a recessed and/or concaved portion that is described in greater detail below.

As best shown in FIG. 2, the vehicle 10 is a conventional vehicle that includes, among other things, a passenger compartment with a floor 16. The upholstered seat assemblies 12 and 14 are preferably mounted to the floor 16 in a conventional manner.

Figure 3:
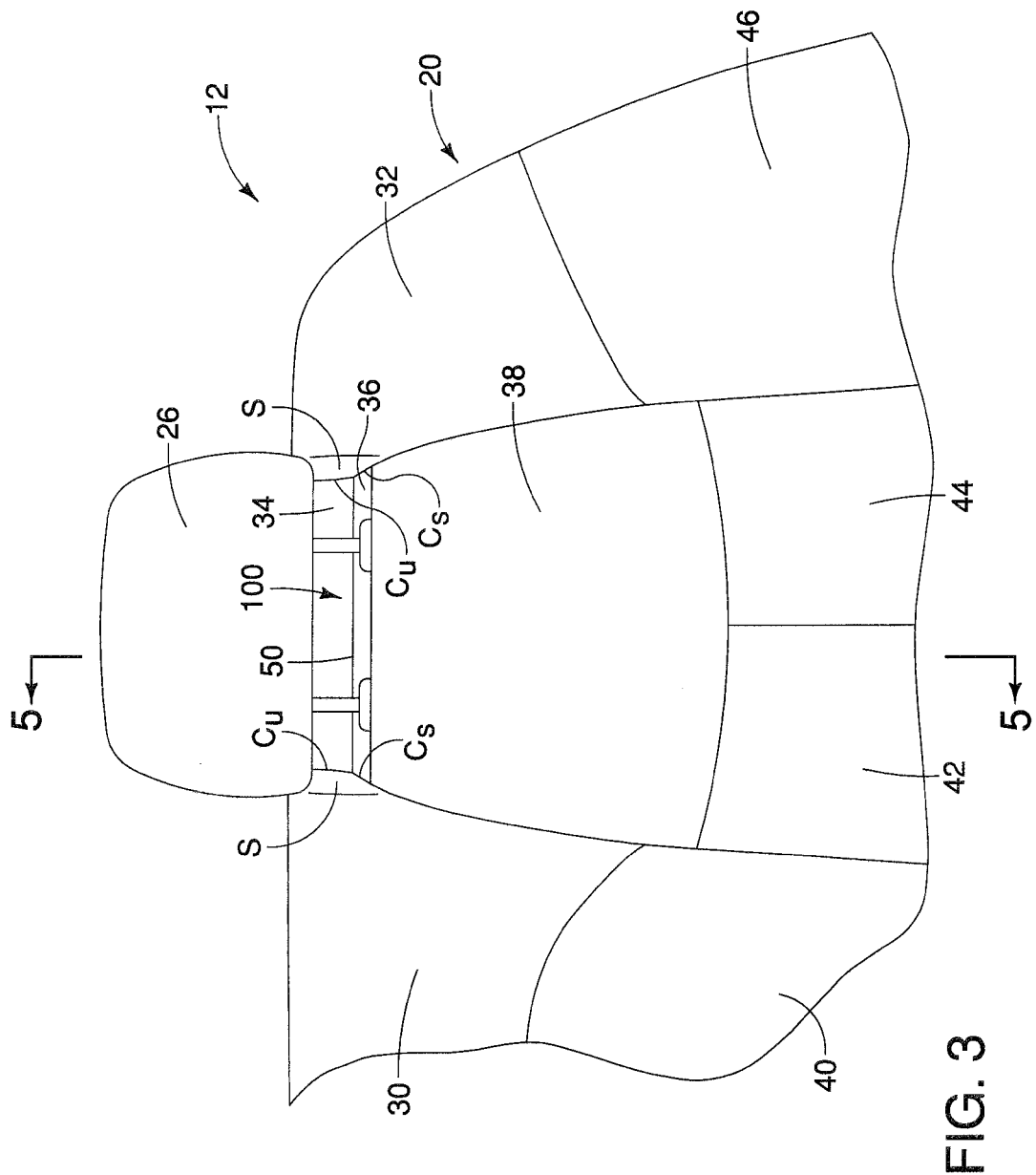
FIG. 3 is a front view of an upper portion or backrest portion of one of the upholstered seat assemblies in accordance with a first embodiment of the present invention.
Figure 4:
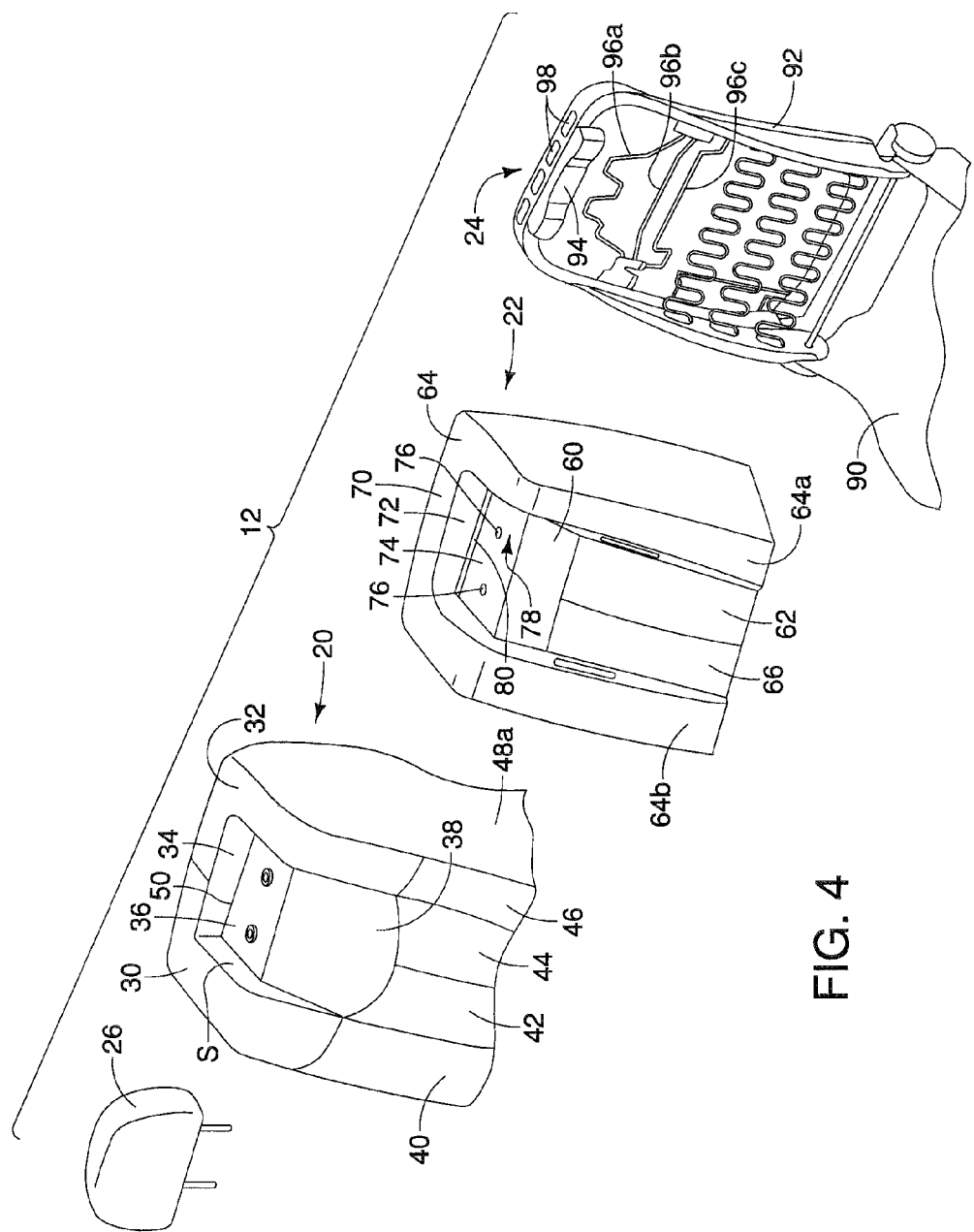
FIG. 4 is an exploded view of the backrest portion of the upholstered seat assembly depicted in FIG. 3 showing a seat frame, a foam pad, a flexible seat trim cover and a headrest in accordance with the first embodiment of the present invention.

A description of a first embodiment of the upholstered seat assembly 12 is now provided with specific reference to FIGS. 3 and 4. The upholstered seat assembly 12 basically includes a flexible seat trim cover 20, a foam pad 22 (FIG. 4 only), a seat frame 24 (FIG. 4 only) and a headrest 26.

The flexible seat trim cover 20 includes a plurality of individual upholstery panels stitched or otherwise fixed to one another to form the overall shape of the flexible seat trim cover 20 and the overall shape and contours of the upholstered seat assembly 12. The flexible seat trim cover 20 is preferably made of textile panels, leather or leather-like panels or combinations thereof. The flexible seat trim cover 20 includes a seatback surface 20a and a concealed surface 20b, as indicated in FIGS. 5 and 6.

As indicated in FIG. 4, the flexible seat trim cover 20 includes a first upper panel 30, a second upper panel 32, a recessed panel 34, a headrest panel 36, an inset panel 38, lower panels 40, 42, 44 and 46 and side panels 48a and 48b (side panel 48b is shown only in FIG. 7) that extend around a backside (FIG. 7) of the upholstered seat assembly 12.

A plurality of seams are formed between adjacent sections of the first upper panel 30, the second upper panel 32, the recessed panel 34, the headrest panel 36, the inset panel 38, the lower panels 40, 42, 44 and 46 and the side panels 48a and 48b. For purposes of explaining the present invention, only the seam 50 (shown in FIG. 4) is described below. The seam 50 extends between the headrest panel 36 and the recessed panel 34 joining these two panels together.

Figure 7:
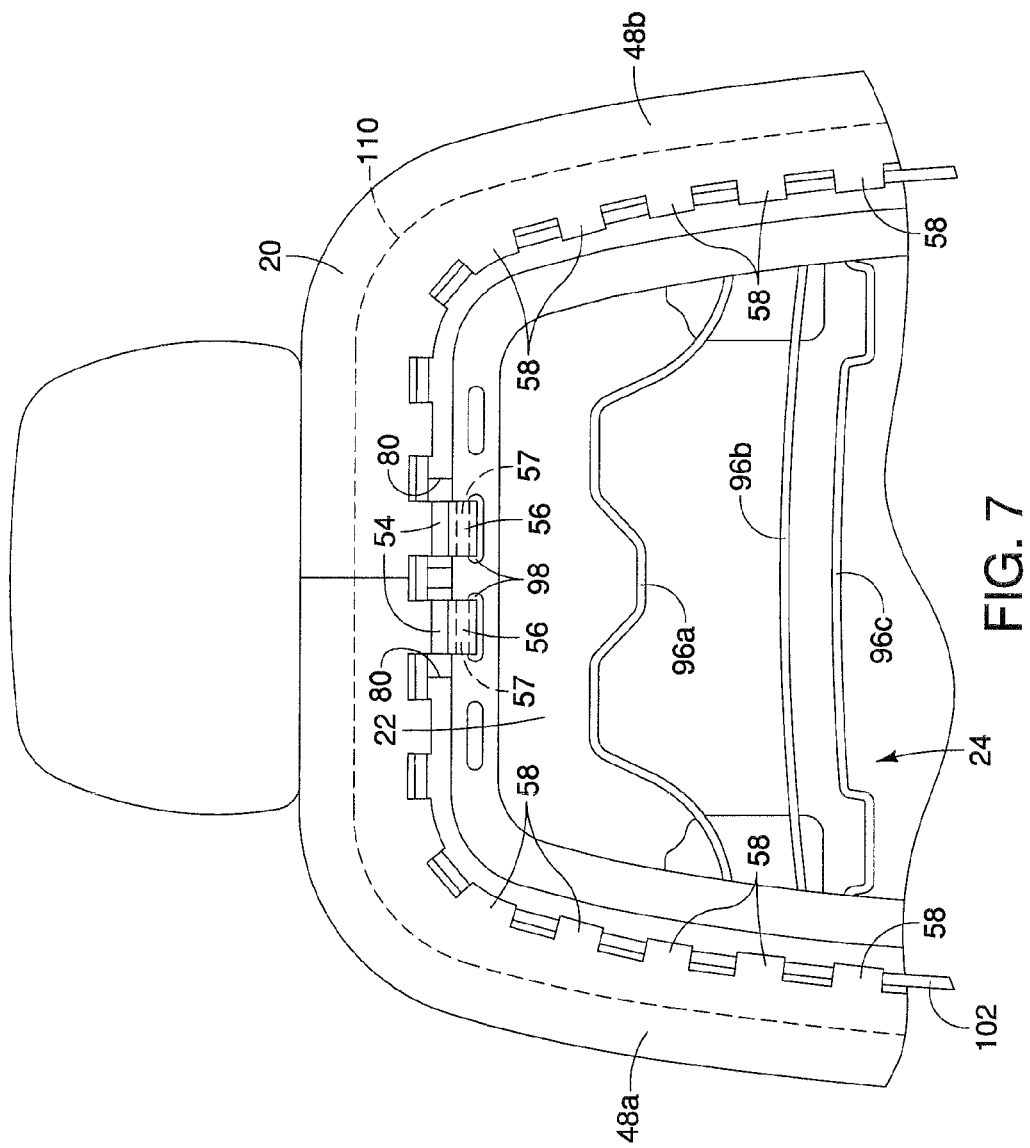
FIG. 7 is a rear view of the backrest portion of the upholstered seat assembly similar to FIG. 5, showing the attachment member fixed to the attachment point of the seat frame in accordance with a first embodiment of the present invention.

As best shown in FIGS. 5 and 6, the seam 50 includes at least one concealed attachment member 52 and preferably two attachment members 52, as shown in FIG. 7. Each attachment member 52 includes a strap portion 54 that is fixed to the seam 50, as shown in FIGS. 5 and 6. Each attachment member 52 further includes a looped portion 56 and a hooking member 57. It should be understood from the drawings and description herein that the attachment member 52 is a flexible member that is attached to the flexible seat trim cover 20 at the seam 50 and the hooking member 57 is a fastener that is attached to the strap portion 54 (a flexible member) of the attachment member 52.

As best shown in FIG. 7, the side panels 48a and 48b are dimensioned to extend around a backside of the upholstered seat assembly 12. The side panels 48a and 48b include a plurality of loops 58 that are described in greater detail below.

A description of the foam pad 22 is now provided with specific reference to FIG. 4. The foam pad 22 is preferably made of a conventional seat padding material or foam that is resilient and provides a comfortable seating material. The foam pad 22 can also be made of a combination of differing seating materials such that different sections of the foam pad 22 have different compressibility characteristics.

The foam pad 22 can be made of a single foam pad member molded and/or cut to a prescribed shape or can include several individual foam pad section assembled and fixed to one another to define the prescribed seat shape, such as the shape shown in FIG. 4. The foam pad 22 includes a central upper section 60, a central lower section 62 and an outer section 64 that has side sections 64a and 64b. The outer section extends along an upper end of the foam pad 22 and the side sections 64a and 64b extend downward along opposite sides of the central upper section 60 and further downward along opposite sides of the central lower section 62. The foam pad also has a front surface 66 and a back surface 68 shown in FIGS. 5 and 6.

The outer section 64 further includes an upper surface 70, a recessed surface 72, and a headrest surface 74. The headrest surface 74 includes a pair of apertures 76. The recessed surface 72 and the headrest surface 74 together at least partially define a recess 78 (a headrest recess) that has a concaved contour relative to the remainder of the foam pad 22. The headrest surface 74 is offset from the upper surface 70. The recessed surface 72 is preferably angularly offset from the upper surface 70 and is further approximately perpendicular to the headrest surface 74.

The foam pad 22 is further provided with at least one attachment opening 80 that is formed between the recessed surface 72 and the headrest surface 74. As best shown in FIG. 5, the attachment opening 80 extends from a front surface 66 of the foam pad 22, through the foam pad 22 to the back surface 68 of the foam pad 22. More specifically, the attachment opening 80 extends from the recess 78 to the back surface 68 of the foam pad 22. The attachment opening 80 is preferably an elongated slot or plurality of slots dimensioned to receive the attachment member 52 or a plurality of attachment members 52, as described in greater detail below.

It should be understood from the drawings and the description herein that the shape of the foam pad 22 depicted in FIG. 4, is merely one example of a foam pad that subsequently defines an overall seat shape. The foam pad 22 can have any of a variety of shapes and can be dimensioned to serve in a bucket-type seat configuration or can be dimensioned and shaped to serve as part of a bench-type seat configuration.

A description of the seat frame 24 is now provided with specific reference to FIG. 4. The seat frame 24 is preferably a metallic assembly that includes shaped and contoured steel elements that subsequently support the various portions of the upholstered seat assembly 12. The seat frame 24 basically includes a seat cushion support portion 90 and a backrest support portion 92. The seat cushion support portion 90 includes a mounting section (not shown) that mounts to the floor 16 of the vehicle 10 in a conventional manner. The backrest support portion 92 includes a headrest support portion 94 that includes a conventional mechanism for supporting the headrest 26 such that the vertical position of the headrest 26 can be adjusted. The backrest support portion 92 also includes a plurality of structural elements 96a, 96b and 96c, and at least one attachment point 98. In the depicted embodiment there are four attachment points 98 provided adjacent to the headrest support portion 94.

It should be understood from the drawings and the description herein that the seat frame 24 can alternatively be divided into two separate assemblies. Specifically, the seat frame 24 can have a seat cushion support portion that is separated from the backrest support portion. More specifically, in the case where the upholstered seat assembly 12 is a bench-style seat, the backrest support portion can be attached within the passenger compartment of the vehicle 10 separately from the corresponding seat cushion support portion. With such a configuration, the bench-style seat cushion support portion is separately installed to the floor 16 within the passenger compartment of the vehicle 10.

The attachment points 98 of the seat frame 24 can be wire frame elements or, as depicted, can be a metallic plate with a series of elongated holes formed therein. The actual size, dimensions and overall shape of the attachment points 98 vary depending upon the overall seat shape and seat configuration and are not limited to the depicted shape and configuration.

With the upholstered seat assembly 12 fully assembled, as shown in FIG. 3, an upper portion of the upholstered seat assembly 12 includes a headrest recess 100. The headrest recess 100 is at least partially defined by the recess 78 of the foam pad 22 (shown in FIG. 4) and the recessed panel 34 and the headrest panel 36 of the flexible seat trim cover 20. More specifically, the headrest recess 100 includes a bottom wall $W_1$ (a generally horizontal bottom surface) defined by the headrest panel 36 of the flexible seat trim cover 20. The headrest recess 100 includes a rear wall $W_2$ (a recessed surface) that extends upwardly from the bottom wall (the headrest panel 36). The rear wall $W_2$ is defined by the recessed panel 34 of the flexible seat trim cover 20. The seam 50 further defines a bottom corner of the headrest recess 100 at the intersection of the bottom wall (the headrest panel 36) and the rear wall (the recessed panel 34). Finally, the headrest recess 100 includes a pair of side walls S shown best in FIG. 3, extending upwardly from the bottom wall (the headrest panel 36) to foam a pair of side corners $C_S$ therebetween and forwardly from the rear wall (the recessed panel 34) to form a pair of upright corners $C_U$. As shown in FIGS. 5 and 6, the attachment opening 80 is located along at least one of the bottom corner, the side corners $C_S$ and the rear upright corners $C_U$ of the headrest recess 100.

The headrest recess 100 is concaved relative to the remainder of the upholstered seat assembly 12. The concaved shape of the headrest recess 100 is maintained in large part by the attachment member 52, as described below. As shown in FIG. 6, the rear wall $W_2$ (the recessed surface) is angularly offset by an angle $\alpha_1$ from the bottom wall $W_1$ (the bottom surface). As is also shown in FIG. 6, the angle $\alpha_1$ is an obtuse angle. Further, the bottom wall $W_1$ (the bottom surface) of the headrest recess 100 and the seatback surface 20a of the upholstered seat assembly 12 are angularly offset from one another by an angle $\alpha_2$. The angle $\alpha_2$ is also an obtuse angle. As indicated in FIG. 6, the attachment member 52 and the seam 50 are at least partially disposed within the attachment opening 80, and the attachment member 52 and the seam are lower (below) the level of the wall $W_1$ (the bottom surface) of the headrest recess 100.

During the assembly process of the upholstered seat assembly 12, the foam pad 22 is positioned to overlay the seat frame 24 such that the attachment point 98 of the seat frame 24 is located in an area of the recess 78 and the subsequently formed headrest recess 100, as shown in FIGS. 5 and 6.

The flexible seat trim cover 20 is then positioned over the foam pad 22 such that the flexible seat trim cover 20 overlays the front surface 66 of the foam pad 22. Next, the attachment members 52 are fed through the attachment opening 80 of the foam pad 22, as shown in FIG. 5 such that the attachment members 52 extends through the attachment opening 80. Next, as shown in FIG. 6, the looped portion 56 is pulled taut such that the hooking member 57 can be hooked or otherwise attached to the attachment point 98 of the seat frame 24. With the hooking member 57 hooked or otherwise attached to the attachment point 98 of the seat frame 24, it is possible to maintain the desired shape and contours of the headrest recess 100.

Next, as shown in FIG. 7, a securing member 102 is fitted through the loops 58 of the flexible seat trim cover 20 in order to pull the flexible seat trim cover 20 tight around the foam pad 22 and seat frame 24. The securing member 102 is preferably a conventional tensioning line, such as a polymer string or rope conventionally used in vehicle upholstery.

The headrest 26 is installed to the upholstered seat assembly 12 in a conventional manner. Further, an upholstery backing member 110 can be installed in a conventional manner to the back side of the upholstered seat assembly 12 to conceal the securing member 102 and the loops 58 of the flexible seat trim cover 20.

It should be understood from the drawings and the description herein, that although only two of the attachment members 52 are shown in FIG. 7, any number of attachments members 52 can be employed in the upholstered seat assembly 12 in order to maintain the desired shapes and contours of the seat regardless of the number of concaved or recessed areas in the overall design of the seat assembly.

The headrest 26 is installed to the upholstered seat assembly 12 in a conventional manner. Further, an upholstery backing member 110 can be installed in a conventional manner to the back side of the upholstered seat assembly 12 to conceal the securing member 102 and the loops 58 of the flexible seat trim cover 20. Consequently, the attachment members 52 are completely disposed and concealed within the upholstered seat assembly 12 with the upholstered seat assembly 12 fully assembled such that the attachment members 52 are un-noticeable from an exterior surface of the seat trim cover 20.

It should also be understood from the drawings and description herein that the configuration of the attachment members 52 can include configurations that differ from the arrangement shown in FIGS. 5 and 6. Specifically, the hooking member 57 can be replaced with any of a variety of fastening means, as shown in the following alternate embodiments.

Second Embodiment

Referring now to FIG. 8, an attachment member 152 shown in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the flexible seat trim cover 20 is the same as in the first embodiment except that the attachment member 52 has been replaced with the attachment member 152. Specifically, the attachment member 152 is fixed to the seam 50 but includes only a flexible strap with a loop 154 at a distal end thereof. Further, the seat frame 24 is identical to the first embodiment except that the attachment point 98 of the seat frame 24 is provided with a flexible strap that includes a hooking member 156 disposed at a distal end of the flexible strap. In the second embodiment, the loop 154 and the hooking member 156 are connected to one another during the assembly process to maintain the headrest recess 100 in its desired shape.

Third Embodiment

Referring now to FIG. 9, an attachment member 252 is shown in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the flexible seat trim cover 20 is the same as in the first embodiment except that the attachment member 52 has been replaced with the attachment member 252. Specifically, the attachment member 252 is fixed to the seam 50 but includes a flexible strap with two portions of a textile loop and hook combination (Velcro®) at a distal end thereof. The two portions of the textile loop and hook combination are wrapped around the attachment point 98 of the seat frame 24 in order to maintain the overall shape of the headrest recess 100.

Fourth Embodiment

Referring now to FIG. 10, an attachment member 352 shown in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the flexible seat trim cover 20 is the same as in the first embodiment except that the attachment member 52 has been replaced with the attachment member 352. Specifically, the attachment member 352 is fixed to the seam 50 but includes a flexible strap that is wrapped part way around the attachment point 98 of the seat frame 24 and then clamped in place by a clamping member 354 and fastener 356.

Fifth Embodiment

Figure 12:
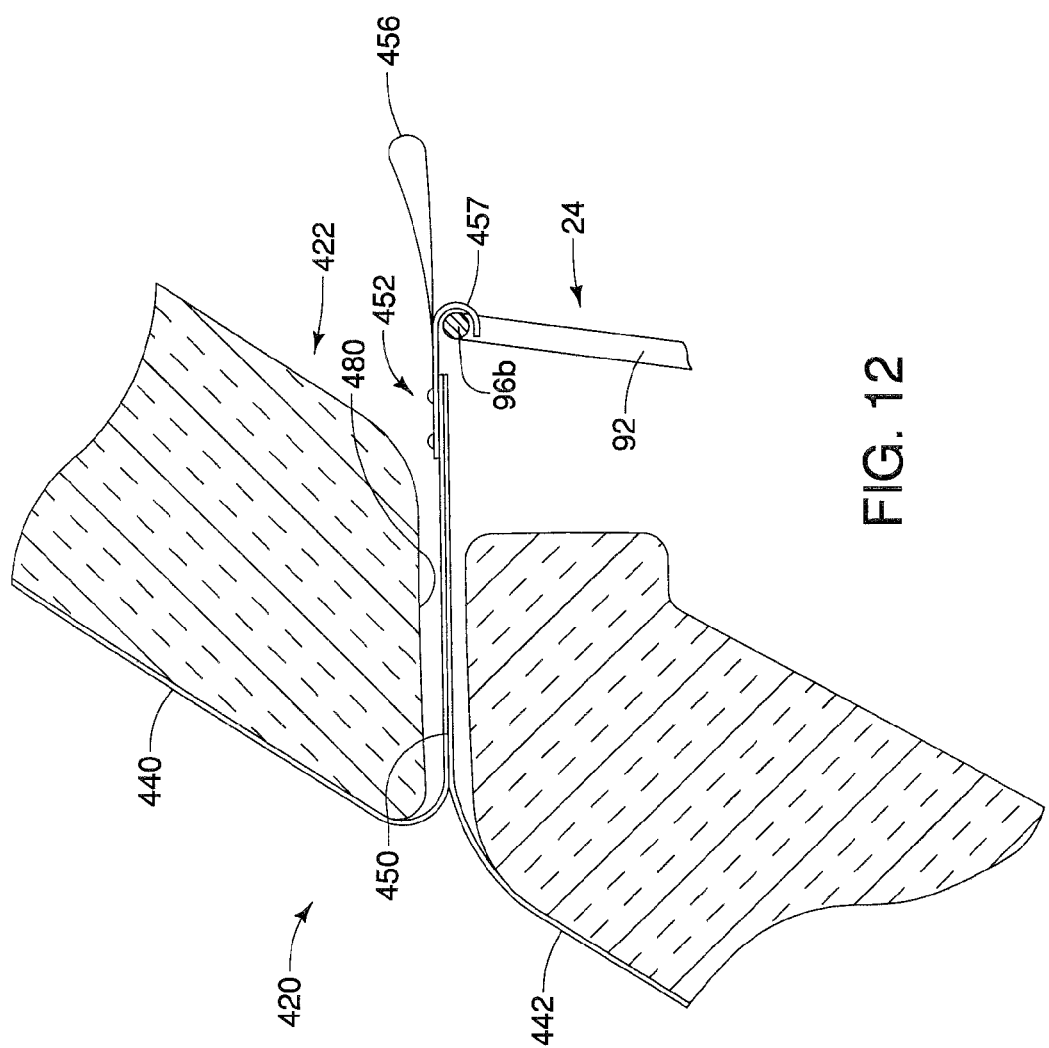
FIG. 12 is a cross-sectional view of the backrest portion of the upholstered seat assembly showing an attachment member fixed to an attachment point of the seat frame in accordance with the fifth embodiment of the present invention.

Referring now to FIGS. 11 and 12, the seat assembly 14 is shown in accordance with a fifth embodiment that will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, a flexible seat trim cover 420 is installed over a foam pad 422 (shown in FIG. 12 only), which is further installed over the backrest support section 92 of the seat frame 24. The flexible seat trim cover 420 includes a plurality of upholstery panels, including the panels 440 and 442. A seam 450 joins the panels 440 and 442 together in a region where the seat assembly 14 includes a concave contour. As best shown in FIG. 12, the seam 450 also includes an attachment member 452 that has a looped portion 456 and a hooking member 457.

The foam pad 422 of the seat assembly 14 includes a recessed joint that further includes an attachment opening 480 located at a central region of the concave contour of the seat assembly 14. The attachment member 452 extends through the attachment opening 480 and is secured to an attachment point on the structural element 96b of the seat frame 24.

Sixth Embodiment

Referring now to FIGS. 11 and 13, a seat cushion portion (a bottom portion) of the seat assembly 14 shown in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, a flexible seat trim cover 520 is installed over a foam pad 522, which is further installed over the seat cushion support portion 90 of the seat frame 24. The flexible seat trim cover 520 includes a plurality of upholstery panels, including the panels 540 and 542. A seam 550 joins the panels 540 and 542 together in a region where the seat assembly 14 includes a concave contour. As best shown in FIG. 13, the seam 550 also includes an attachment member 552 that has a looped portion 556 and a hooking member 557.

The foam pad 522 of the seat cushion portion of seat assembly 14 includes a recessed joint with an attachment opening 580 located at a central region of the concave contour of the seat cushion portion of the seat assembly 14. The attachment member 552 extends through the attachment opening 580 and is secured to an attachment point 598 on the seat cushion support portion 90 of the seat frame 24.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the vehicle seat of the present invention. Accordingly, these terms, as utilized to describe the vehicle seat should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat comprising:
a seat frame that includes a backrest portion with at least one attachment point on the backrest portion of the seat frame;
a pad overlying the backrest portion of the seat frame with at least one attachment opening; and
a flexible seat trim cover overlying a front surface of the pad, the pad and seat trim cover being shaped to form a concave headrest recess dimensioned to receive a portion of a moveable headrest, the attachment opening being located within the headrest recess, the seat trim cover having at least one attachment member extending through the attachment opening that is secured to the attachment point of the seat frame to hold the seat trim cover against the front surface of the pad and the surface of the headrest recess, the attachment member and the attachment point being located in the area of the headrest recess and concealed within the vehicle seat with the vehicle seat fully assembled, the seat trim cover further including at least one aperture dimensioned to receive a headrest supporting member of the movable headrest, the at least one aperture being spaced apart from the attachment opening.

2. The vehicle seat according to claim 1, wherein
the seat trim cover is made of at least two upholstery panels with the attachment member being located at a seam that connects the two upholstery panels of the seat trim cover.

3. The vehicle seat according to claim 1, wherein
the attachment member includes a flexible member attached to the seat trim cover and a fastener attached to the flexible member, with the fastener secured to the attachment point of the seat frame.

4. The vehicle seat according to claim 1, wherein
the headrest recess is defined by a bottom wall, a rear wall extending upwardly from the bottom wall to form a bottom corner therebetween, and a pair of side walls extending upwardly from the bottom wall to form a pair of side corners therebetween and forwardly from the rear wall to form a pair of upright corners therebetween.

5. The vehicle seat according to claim 4, wherein
the attachment opening is located along at least one of the bottom corner, the side corners and the rear upright corners.

6. The vehicle seat according to claim 5, wherein
the attachment member includes a flexible member attached to the seat trim cover and a first fastener attached to the flexible member, with the fastener secured to the attachment point of the seat frame.

7. The vehicle seat according to claim 6, wherein
the seat trim cover is made of at least two upholstery panels that are connected to form a seam overlying a portion of the headrest recess, with the flexible member being located at the seam.

8. The vehicle seat according to claim 4, wherein
the at least one aperture is located in the bottom wall of the headrest recess.

9. The vehicle seat according to claim 1, wherein
the pad has a first contoured portion and a second contoured portion that overlie the backrest portion and that meet to form a recessed joint therebetween, and the attachment opening is located along the recessed joint.

10. The vehicle seat according to claim 1, wherein
the headrest recess includes a generally horizontal bottom surface and a recessed surface that is angularly offset from the bottom surface by an obtuse angle, the bottom surface and a seatback surface of the vehicle seat being angularly offset from one another by an obtuse angle.

11. The vehicle seat according to claim 10, wherein
the attachment opening of the pad is located at an intersection of the recessed surface and the bottom surface of the headrest recess, and
the attachment member extends from a seam formed in the seat trim cover, the seam being positioned proximate the intersection of the recessed surface and the bottom surface of the headrest recess and the attachment opening.

12. The vehicle seat according to claim 11, wherein
the attachment member and the seam are disposed within the attachment opening at a level below the bottom surface.

13. The vehicle seat according to claim 12, wherein
the attachment member and the seam are concealed within the attachment opening.

14. The vehicle seat according to claim 11, wherein the attachment member and the seam are concealed within the attachment opening.

15. The vehicle seat according to claim 10, wherein the at least one aperture is located in the bottom surface of the headrest recess.

16. The vehicle seat according to claim 1, wherein the seat trim cover includes a seatback surface and a concealed surface with the vehicle seat fully assembled, the attachment member being fixedly attached to the concealed surface of the seat trim cover.

17. The vehicle seat according to claim 1, wherein the attachment point of the seat frame is located on a structural element of the seat frame and the structural element at the attachment point has a circular shape when viewed in cross-section.

18. The vehicle seat according to claim 1, wherein the pad comprises a foam pad.

19. The vehicle seat according to claim 1, wherein the at least one aperture is located within the headrest recess.

* * * * *